United States Patent [19]

Ford et al.

[11] 4,079,256

[45] Mar. 14, 1978

[54] RATIO-RECORDING SPECTROPHOTOMETER WITH SUPPRESSION OF UNCOMPENSATION

[75] Inventors: Michael Alan Ford, Maidenhead; Bernard Brian Leather, High Wycombe, both of England

[73] Assignee: Perkin-Elmer Limited, Beaconsfield, England

[21] Appl. No.: 757,205

[22] Filed: Jan. 6, 1977

[30] Foreign Application Priority Data

Jan. 7, 1976 United Kingdom .................. 426/76

[51] Int. Cl.$^2$ ........................................... G01N 21/26
[52] U.S. Cl. ................................................ 250/343
[58] Field of Search ................ 250/343, 344, 345, 233

[56] References Cited

U.S. PATENT DOCUMENTS 3,542,480 11/1970 Ford ............................... 250/233 X Primary Examiner—Davis L. Willis Attorney, Agent, or Firm—S. A. Giarratana; F. L. Masselle; E. T. Grimes

[57] ABSTRACT

A double-beam, time-sharing, ratio-recording spectrophotometer in which the reference signal data is evaluated both in an actual demodulation cycle and in a different cycle, which may be either a preceding or a following cycle. The two evaluations are combined to produce derived reference signal data. Ratioing means are included for extracting the ratio between the sample signal data evaluated in an actual demodulation cycle and the derived reference signal data. Predetermined multiplying factors may be used in arriving at the derived reference signal data. The interpolation of reference signal data from actual and non-actual demodulation cycles enables the effect of uncompensation on photometric accuracy to be minimized. Uncompensation results from the fact that in a time-sharing spectrophotometer sample and reference signal data do not occur at the same time and do not therefore relate to the same environment and the same wavelength.

17 Claims, 1 Drawing Figure

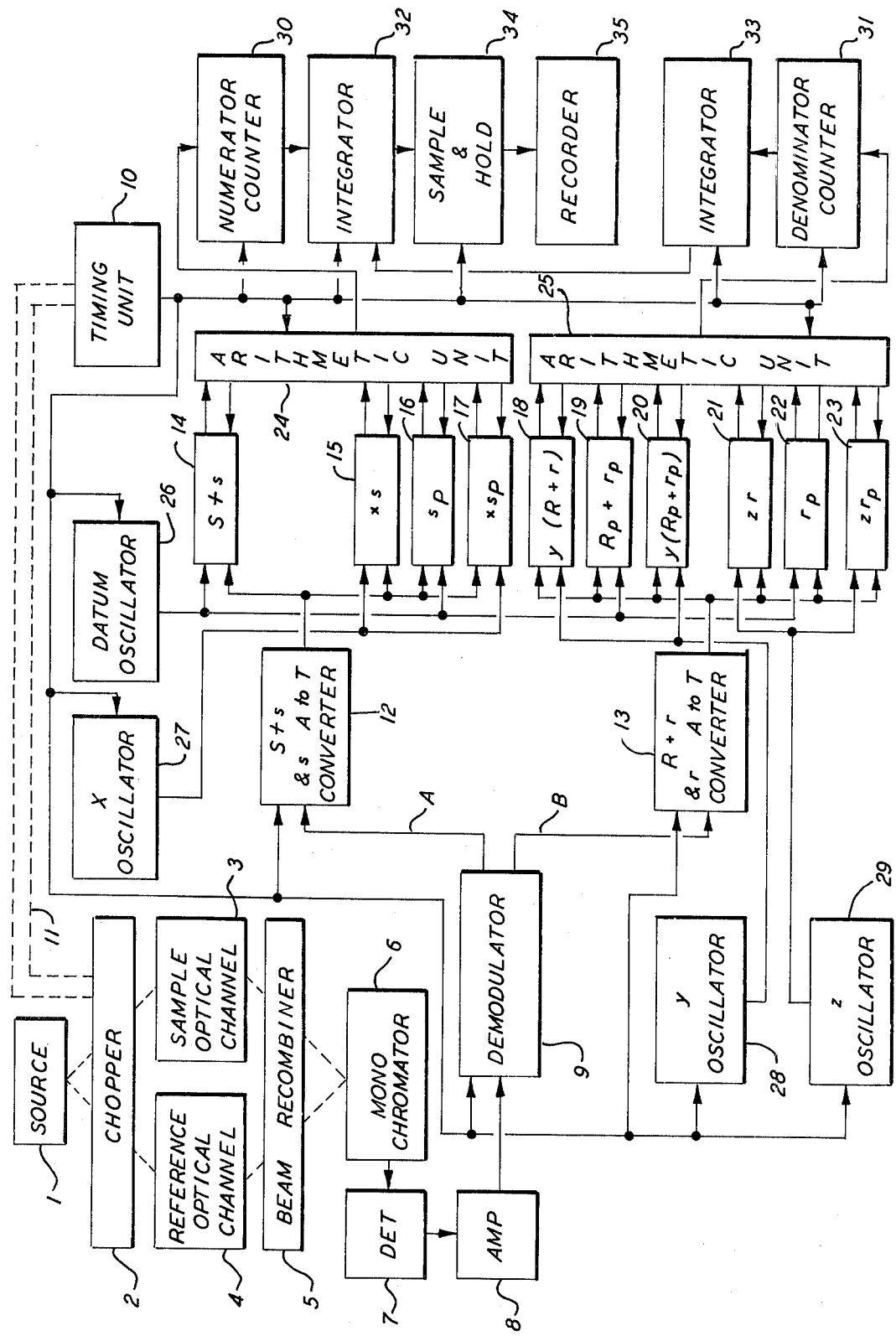

RATIO-RECORDING SPECTROPHOTOMETER WITH SUPPRESSION OF UNCOMPENSATION

BACKGROUND OF THE INVENTION

The present invention relates to double-beam spectrophotometers of the type wherein a beam from a suitable radiation source is directed alternately into a sample optical channel and a reference optical channel and is then re-directed alternately from one and other channel along a common optical path through a monochromator and onto a detector capable of generating an electrical output proportional to the intensity of the intercepted radiation, the dividing and recombining of the said beam performed by a constant-rate beam-switching arrangement such that the detector output comprises a sample signal component and a reference signal component that may be compared by generating the ratio between the two. In other words, the present invention relates to double-beam time-sharing ratio-recording spectrophotometers but not to spectrophotometers in which the beams are coincident in time.

The term "recording" in the phrase "ratio-recording", which has a well recognized meaning in the art, is here intended to refer to any convenient presentation of said ratio leading to the production of a permanent record, e.g. chart recording, or a transient display, e.g. digital read out.

The object of any double-beam arrangement is to remove from the output signal of the spectrophotometer the effect of spurious absorption that is common to both optical channels, e.g. absorption by atmospheric water vapour. The said arrangment operates, therefore, on the common mode rejection principle.

In spectrophotometers of the type to which the present invention applies, the beam of radiation exists in one optical channel for one half of the time and in the other channel for the other half. This means that the detector responds to the two channels sequentially or, in other words, the measurement of sample channel radiation is not simultaneous with the measurement of reference channel radiation. It clearly follows that if an absorption change takes place in one optical channel that has no exact counterpart in the other channel a common mode rejection failure must inevitably result. In the art this form of failure is referred to as "uncompensation".

In so far as absorption is, of course, wavelength dependent, uncompensation must arise in any time-sharing double-beam ratio-recording spectrophotometer used in the scanning mode, since the radiation emerging from the two channels is not measured at the same wavelength and consequently the ratio between the two measurements will not eliminate, for example, the effect of water vapour absorption. Uncompensation can be particularly troublesome in infrared spectrophotometers having extended optical path lengths.

SUMMARY OF THE INVENTION

It is an object of the present invention to provide a double-beam ratio-recording spectrophotometer in which the effect of uncompensation as defined is minimized in the interest of greater photometric accuracy.

According to the present invention there is provided a time-sharing double-beam ratio-recording spectrophotometer wherein means are provided for producing in operation the ratio between an electrical signal representative of sample transmission (or absorption) and an electrical signal substantially representative of what reference transmission (or absorption) would have been had its measurement been made simultaneously with that of the sample transmission (or absorption) signal.

More specifically, in a time-sharing, double-beam, ratio-recording spectrophotometer comprising a source of photometric radiation, a sample optical channel and a reference optical channel each adapted to receive radiation from said source, beam switching means for directing the radiation beam emerging from one and other channel alternately along a common path, a monochromator adapted to receive radiation from said common path, a detector adapted to receive radiation that has passed through the monochromator, said detector providing an electrical output proportional to teh radiation impinging thereon, the said output including sample signal data representing radiation emerging from the sample optical channel and reference signal data representing radiation emerging from the reference optical channel and means for demodulating sample and reference signal data in one demodulation cycle, there is provided the combination of:

(a) means for evaluating the reference signal data appertaining to a demodulation cycle other than the actual demodulation cycle in which the sample signal data is evaluated, (b) means for combining the said reference signal data as at (a) with reference signal data appertaining to the actual demodulation cycle in order to produce derived reference signal data; and (c) means for extracting the ratio between the sample signal data appertaining to the actual demodulation cycle and said derived reference signal data.

The invention may be carried into effect by providing means for effecting a suitable interpolation between reference signal measurements preceding and following a sample signal measurement.

In the simplest of cases, the interpolation may be of the first order. Higher orders (quadratic, etc.) may be provided for, if the particular application of the invention would benefit from the higher photometric accuracy thus attainable.

In outlining how a first order interpolation may be arranged in practice, we shall assume that the spectrophotometer to which it is to be applied employs a beam switching pattern as described in our U.S. Pat. No. 3,542,480 (imported in full into the present application), which allows the photometric detector to respond in four consecutive quadrants to Sample Transmission plus Sample Re-radiation $(S + s)$, Reference Transmission plus Reference Re-radiation $(R + r)$, Sample Re-radiation $(s)$ and finally Reference Re-radiation $(r)$, in that order (re-radiation is a term used to identify temperature-dependent infrared emission from any part of the spectrophotometer "seen" by the sample and reference channels, respectively). The sample transmission to reference transmission ratio is computed by simply subtracting the signal arising in the third quadrant from the signal arising in the first quadrant to obtain a sample transmission (S) and subtracting the signal in the fourth quadrant from that in the second quadrant to obtain reference transmission (R), before computing the ratio S/R. Expressed in the symbols as given, we have:

$$\frac{(S + s) - s}{(R + r) - r} = \frac{S}{R}$$

The elimination of the re-radiation effect from the computed sample to reference ratio is a refinement that is not strictly essential for carrying the present invention into effect, but we have referred to it since it contributes to the overall photometric fidelity and the invention is thus seen to apply to the more complex situation.

As a first approach to the linear interpolation of the reference signal we could substitute $(R + r)$ in the above expression with $\frac{3}{4}(R + r) + \frac{1}{4}(R_p + r_p)$, wherein the suffix ($p$) stands for preceding so that ($R_p$) and ($r_p$) signify the reference and reference re-radiation signals, respectively, as measured in the preceding cycle of four quadrants. This would constitute an improvement over the hitherto known art but can be further refined by taking into account the fact that ($s$) and ($r$) are also evaluated at different wavelengths. It can be shown mathematically that a full idealized interpolation accounting for the re-radiation quadrants as well is substantially as follows:

$$\frac{S}{R} = \frac{(S + s) - \frac{1}{2}s - \frac{1}{2}s_p}{\frac{3}{4}(R + r) + \frac{1}{4}(R_p + r_p) - \frac{3}{4}r_p - \frac{1}{4}r} \quad \text{I)}$$

As fully explained in copending U.S. application Ser. No. (Attorney Docket No. PL-2286) of Micheal Alan Ford and David Jackson entitled "Cross-Talk Balancing Circuit for Spectrophotometers", exceuted on Dec. 8, 1976 and claiming priority under 35 USC 119 from U.K. Provisional Specification 53086/75 filed Dec. 30, 1976, a signal arising in any of the four quadrants receives contributions from a number of preceding quadrants. This effect is known in the art as "cross-talk". Where cross-talk is particularly troublesome (it actually depends on a number of factors among which the responsiveness of the detector is quite significant) the idealized interpolation may be altered to fit the real-world situation. Again, it can be shown mathematically that a better approximation to the problem of eliminating the uncompensation effect is achieved by applying the following expression:

$$\frac{(S + s) - xs - (1 - x)s_p}{y(R + r) + (1 - y)(R_p + r_p) - zr - (1 - z)r_p} \quad \text{II)}$$

where the multiplication $x$, $y$ and $z$ would in theory have the values of $\frac{1}{2}$, $\frac{3}{4}$ and $\frac{1}{4}$. In practice, said values are best adjusted experimentally until the closest approximation is obtained.

The computation of the expression as given at (II) may be effected by resorting to any convenient computing techniques. A digital approach having particular advantages may involve the conversion of the signals arising in each of the four quadrants into corresponding pulse length, the $(S + s)$ signal and the ($s$) signal being dealt with in one electrical channel and the $(R + r)$ and ($r$) signals in another channel, under the control of quadrant identifying pulses and demodulation-cycle synchronization pulses (the manner in which both types of pulses may be generated is described in our co-pending application referred to earlier).

The multiplying factors may each be represented by an oscillator the frequency of which is equal to the frequency of a standard oscillator multiplied by the represented factor.

If a signal, say $(S + s)$ is not required to be multiplied by any of the said factors, the standard oscillator is gated to an $(S + s)$ counter for the time represented by the converted $(S + s)$ signal. If a signal, say ($s$), is to be multiplied by a factor, say ($x$), the ($x$) oscillator is gated to the ($s$) counter for a time corresponding to the converted ($s$) pulse.

The expression (II) includes 10 terms, which means that it would be logical to use 10 separate counters, although in practice matters may be so arranged that certain values share the same counter so that the total number of counters may, for example, be reduced by half. We believe that in this outline of one possible embodiment of the invention reference to separate counters facilitates understanding.

The output of each counter is taken to an arithmetic unit which yields the numerator and denominator of the expression (II) in separate channels, leading to numerator counter and denominator counter, respectively. Provision must naturally be included in said unit for the counter outputs being made available at the appropriate time having regard to the fact that the values accruing in the counters occur at different quadrants spread over two demodulation cycles and each cycle is in turn an actual cycle to the one preceding it and a preceding cycle to the one following it.

The next step consists in providing digital to analogue conversion of numerator and denominator by means of separate conversion systems incorporating integrators and in extracting the ratio of the two analoque outputs. An apparently novel approach is to start both integrators at the completion of each second demodulation cycle and allow them to accumulate linearly until the associated counter has counted down to zero, i.e. the digital value stored in the counter is converted to pulse length, after which the two integrators are discharged exponentially at the same rate until a threshold value of the denominator is reached. At that time the content of the numerator integrator is sampled. It can be shown that the said content (a voltage level in fact) is the required ratio ready for recording.

In one practical embodiment of the invention in accordance with the above outline the multiplying factors selected were:

$x = 0.28$ $y = 0.57$ $z = 0.38$

BRIEF DESCRIPTION OF THE DRAWING

The attached drawing represents a block diagram of an apparatus in accordance with the present invention, incorporated in a time-sharing, double-beam, ratio-recording, infrared spectrophotometer.

DETAILED DESCRIPTION OF A PEFERRED EMBODIMENT

The apparatus represented in the attached block diagram realizes the present invention by computing the expression (II) given under the sub-heading: Summary of the Invention. It is shown incorporated in an infrared, double-beam, ratio-recording spectrophotometer having a photometric system basically as described in U.S. Pat. No. 3,542,480, in which the "chopping" of the photometric radiation is designed to minimize the lowering of photometric accuracy brought about by the effect of sample and reference re-radiation.

It is to be understood that the lines linking the boxes shown represent signal routes, each of which may require in practice one conductor or a plurality of electrically individual conductors.

In the diagram, photometric radiation from an infrared source 1 is controlled by a constant-speed rotary chopper 2, which in four successive 90° angular travels first allows the radiation to pass through a sample under analysis within a sample optical channel 3, next allows it to pass through a reference sample within a reference optical channel 4, and in the remaining two 90° travels prevents the radiation from reaching both channels. A constant-speed rotary beam recombiner 5 ensures that the radiation beam emerging from one and other optical channel is admitted along a common path leading to the spectrophotometer monochromator 6.

The beam recombiner 5 allows the radiation beam from one optical channel to pass through to the monochromator 6 during one 180° travel and the radiation beam from the other optical channel to pass through during the next 180° travel. It is made to run at twice the speed of the chopper 2 and is so phased thereto that one of said 90° travels during which radiation from the source 1 is admitted to a given optical channel is made to correspond to one of said 180° travels during which radiation that has passed through said given optical channel is allowed to reach the monochromator 6. It follows that the radiation beam reaching the monochromator 6 comprises four optical quadrants, each corresponding to a 90° travel of the chopper 2 during which the monochromator 6 "sees" one or the other optical channel. The four optical quadrants represent, respectively, sample radiation plus sample re-radiation (S + $s$), reference radiation plus reference re-radiation (R + $r$), sample re-radiation ($r$). The manner in which the particular photometric system outlined is utilized to minimize the adverse effect on photometric accuracy of the re-radiation from the two optical channels is fully described in the United States patent referred to.

The monochromator 6 performs a wavelength scan of the recombined photometric beam and the scanned beam is finally admitted to a thermoelectric detector 7, which yields an electrical output proportional to the intensity of the impinging radiation. The output of detector 7 is amplified in amplifier 8, before being extended to a demodulator 9, yielding a demodulated analogue output on channel A which includes signal information arising from the first and third demodulation quadrants representing, respectively, (S + $s$) and ($s$) and a demodulated analogue output on channel B which includes signal information from the second and fourth demodulation quadrants representing, respectively, (R + $r$) and ($r$).

The demodulation quadrants are not time-coincident with the optical quadrants defined by the co-operation of the chopper 2 and the beam recombiner 5. In fact, when thermoelectric detectors are used in a spectrophotometer (in an infrared spectrophotometer they still represent the designer's natural choice) it is generally necessary to delay the demodulation point with respect to the start of the associated optical quadrant because such detectors have a somewhat sluggish electrical response (they obviously need time to heat up and cool down). By allowing time for the detector signal to rise to a significant level before demodulating it, best use may be made of the available detector output. There is, in addition, the cross-talk consideration, as referred to earlier, which finally determines the best setting of the demodulation points. Demodulation must of course be properly phased to the rotation of the chopper 2 and this is achieved by controlling the demodulator 9 through a timing unit 10 referenced to the rotation of the chopper 2, as indicated by the dotted connection 11.

The timing unit 10 provides, in addition, electrical pulses for identifying a demodulation cycle (i.e. a cycle including four demodulation quadrants starting from the (S + $s$) quadrant), so as to distinguish an actual demodulation cycle (i.e. one in progress) from a preceding demodulation cycle, as required for carrying the present invention into effect in accordance with the present embodiment. The unit also provides timing pulses for the logic switching required in the remainder of the apparatus (as will be made clear later in the description) and may in fact be regarded as a master clock driven by the chopper 2.

The demodulated analogue output on channel A is converted to pulse duration in analogue-to-time converter 12, the timing of the conversion being controlled by the unit 10. The demodulated analogue output on channel B is similarly converted by analogue-to-time converter 13, again under the control of unit 10. It will be appreciated that channels A and B supply the information required for the numerator and denominator, respectively, of the expression (II).

The output of converter 12 is fed to numerator digital counters 14 to 17 and that from converter 13 to denominator digital counters 18 to 23. Each of the numerator counters provides an output extending into an input of a numerator arithmetic unit 24 and receives a controlling input from said unit 24. Similarly for the denominator counters in association with denominator arithmetic unit 25. The logic functions of the two arithmetic units are timed by the unit 10.

The digital counters 14 to 23 form part of a time-to-digital conversion as well as a multiplication by $x$, $y$ or $z$ factors, as required by the expression II). Upon the occurrence of a properly timed control signal from the numerator arithmetic unit 24, the (S + $s$) time-converted information available at the output of converter 12 is transferred into counter 14 in a time-to-digital conversion form by gating the datum oscillator 26 to the counter 14 for the duration of the pulse representing (S + $s$). At the end of that duration, the reading of counter 14 will therefore represent the number of pulses at the datum oscillator frequency that have occurred during the pulse. This number represents the (S + $s$) information in digital form and stands therefore for the first numerator term in the expression II). Note that this term does not call for a multiplication by any of factors, $x$, $y$ and $z$ and that, as will presently be made clear, the digital conversion with the aid of the datum oscillator is tantamount to a multiplication of (S + $s$) by 1, which leaves the (S + $s$) information unaltered, of course.

Similarly the remaining numerator terms are entered digitally in counters 15, 16 and 17, respectively, except that the first and last of these require multiplication by the $x$-factor. This is achieved by gating to the counters 15 and 17 the $x$-oscillator 27 instead of the datum oscillator 26. The latter oscillator will of course be used to fill the counter 16 since the term dealt with therein is ($s_p$), which does not require multiplication by any of the three factors. The frequency of the $x$-oscillator 27 is a predetermined fraction of the frequency of the datum oscillator 26. The proper timing of the gating necessary to distinguish between ($s$) and ($s_p$) information is of course established through the control signal issuing from the arithmetic unit 24, which in turn is under the control of the timing unit 10. All the numerator terms are now accounted for. In the drawing, they have been entered within the boxes representing numerator counters 14 to 17, for easy reference.

The operation of the denominator counters 18 to 23, in conjunction with converter 13 and the denominator arithmetic unit 25 is similar to that described above the numerator counters, except that the filling of counters 18 and 20 requires the gating of a $y$-oscillator 28 and the filling of counters 21 and 23 requires the gating of a $z$-oscillator 29. The frequencies of the $x$, $y$ and $z$ oscillators are different fractions of the datum oscillator frequency. Counters 19 and 22 both require the gating of the datum oscillator 26 as in the case of the numerator counters 14 and 16. Again, each denominator term has been entered in the box representing the appertaining counter.

With the numerator and denominator terms now available through the co-operation of counters 14 to 23 and the timing unit 10, the two arithmetic units 24 and 25 are able to perform the simple operations indicated in the numerator and denominator, respectively, of the expression II), again under the control of the unit 10. The digital output of the numerator arithmetic unit 24 is extended to a numerator counter 30 and that of the denominator arithmetic unit 25 to a denominator counter 31.

The next step is to produce the analogue value representing the ratio of sample to reference transmission. To this end there are additionally provided integrators 32 and 33. The control logic provided through unit 10 is such that upon completion of the second demodulation cycle (note that only then the complete information on actual and preceding demodulation cycles becomes available) the integrator 32 is allowed to accumulate linearly clock pulses issuing from the unit 10 until the numerator 30 has been counted down to zero under control of unit 10. This in effect converts the digital value initially stored in counter 30 to pulse length. Similarly, the integrator 32 is allowed to accumulate linearly until the denominator counter 31 has been countered down to zero.

After integrators 32 and 33 have stoped accumulating, they are both discharged exponentially at the same rate until a predetermined threshold value of the integrator 33 is reached. It can be shown that the content remaining in integrator 32 (a voltage level in fact) when the said threshold value is reached represents the required ratio in analogue form or, in other words, the solution of expression II). The content of integrator 32 is sampled by a sample and hold unit 34, controlled by unit 10, and is fed to the input of a pen servo incorporated in recorder 35.

In the foregoing embodiment of the invention the multiplying factors used were as follows:
$x = 0.28$
$y = 0.57$
$z = 0.38$ The above factors also represent the frequency relationship between the datum oscillator and the $x$, $y$ and $z$ oscillators, respectively. The frequency of the $x$-oscillator, for example, is 0.28 of that of the datum oscillator and similarly when the remaining two oscillators are considered and the $y$ and $z$ factors are substituted for the $x$-factor.

What is claimed is:

1. In a time-sharing, double-beam, ratio-recording spectrophotometer comprising a source of photometric radiation, a sample optical channel and a reference optical channel each adapted to receive radiation from said source, beam switching means for directing the radiation beam emerging from one and other optical channel alternately along a common path, a monochromator adapted to receive radiation from said common path, a detector adapted to receive radiation that has passed through the monochromator, said detector providing an electrical output proportional to the radiation impinging thereon, the said output including sample signal data representing radiation emerging from the sample optical channel and reference signal data representing radiation emerging from the reference optical channel and means for demodulating sample and reference signal data in one demodulation cycle, the combination of:

(a) means for evaluating the reference signal data appertaining to a demodulation cycle other than the actual demodulation cycle in which the sample signal data is evaluted;

(b) means for combining the said referenced signal data as at a) with reference signal data appertaining to the actual demodulation cycle in order to produce derived reference signal data; and (c) means for extracting the ratio between the sample signal data appertaining to the actual demodulation cycle and said derived reference signal data.

2. The apparatus of claim 1, wherein the means for evaluating include timing means referenced to the rate of generation of the sample and reference signal data, said timing means being operationally related to the demodulating means and enabling the reference signal data contained in the output of the demodulating means to be distinguished as between data appertaining to an actual cycle and data appertaining to a non-actual cycle.

3. The apparatus of claim 2, wherein the means for combining include arithmetic computing means under the control of said timing means.

4. The apparatus of claim 3, wherein means are provided for storing predetermined multiplication factors and for selectively multiplying reference signal data by said factors.

5. The apparatus of claim 4, including means for extracting reference re-radiation signal data and sample re-radiation signal data and wherein the multiplying means is selectively operable on said re-radiation data.

6. The apparatus of claim 5, wherein the output of the demodulating means is in analogue form and wherein analogue-to-time conversion means are provided connected to the output of the demodulating means to translate an analogue output value to an electrical pulse the duration of which is representative of said value.

7. The apparatus of claim 6, wherein the means for storing predetermined multiplication factors include a datum oscillator of a predetermined frequency and a plurality of oscillators having frequencies each of which is a predetermined fraction of the datum oscillator frequency.

8. The apparatus of claim 7, wherein the said oscillators co-operate with a plurality of digital storage means to which there is connected the output of the analogue-to-time conversion means and the timing means are adapted to control the gating of selected oscillators to the storage means for the duration of a time-converted analogue value in order further to convert said value to digital form.

9. The apparatus of claim 8, wherein the arithmetic computing means is adapted to operate on the digital data in said storage means.

10. The apparatus of claim 3, wherein the output of the arithmetic computing means is in digital form and digital-to-analogue conversion means are provided for converting to analogue form both sample signal data and reference signal data, representing, respectively, numerator and denominator of said ratio.

11. The apparatus of claim 10, wherein a numerator digital counter and a denominator digital counter are provided for storing, respectively, the numerator and denominator output data produced by the arithmetic computing means.

12. The apparatus of claim 11, including a first integrator associated with said numerator digital counter and a second integrator associated with said denominator digital counter, and wherein the timing means are adapted to control the count down to zero of both digital counters while routing to both integrators a constant signal, and to interrupt said signal to an integrator when the count down of the associated counter has been completed, the voltage level thus reached by each integrator representing the analogue conversion of the digital value initially stored in the associated digital counter.

13. The apparatus of claim 12, wherein the timing means are adapted to control the exponential discharge of both integrators, each from the level corresponding to the said analogue conversion, for the duration required to reach a predetemined lower level of said second integrator.

14. The apparatus of claim 13, wherein there is provided a sample and hold device, operationally related to the timing means, for sampling the level of said first integrator and holding it after termination of said exponential discharge, the two integrators in conjunction with the timing means representing said means for extracting the ratio.

15. The apparatus of claim 14, including a recorder having a pen servo, the input of said pen servo being adapted to receive the output of said sample and hold device.

16. The apparatus of claim 1, wherein said ratio represents in essence the expression:

$$\frac{(S + s) - xs - (1 - x) s_p}{y (R + r) + (1 - y) (R_p + r_p) - zr - (1 - z) r_p} \qquad \text{II)}$$

17. The apparatus of claim 2, wherein said means for extracting said ratio include first and second integrators co-operating with the timing means for accumulating electrical levels representative of numerator and denominator values, respectively, and for discharging exponentially from the respective accumulated levels for the duration required to reach a predetermined lower level of the second integrator.

* * * * *

UNITED STATES PATENT OFFICE
CERTIFICATE OF CORRECTION

Patent No. 4,079,256          Dated March 14, 1978

Inventor(s) Michael Alan Ford & Bernard Brian Leather

It is certified that error appears in the above-identified patent and that said Letters Patent are hereby corrected as shown below:

Column 2, line 14, change "teh" to -- the --.

Column 3, line 27, change "exceuted" to -- executed --.

Column 5, line 32, before "The" insert -- and reference re-radiation (r). --.

Column 6, line 35, before "II)" insert --( --.

Column 6, line 47, before "II)" insert --( --.

Column 7, line 21, before "II)" insert --( --.

UNITED STATES PATENT AND TRADEMARK OFFICE
CERTIFICATE OF CORRECTION

PATENT NO. : 4,079,256

DATED : March 14, 1978

INVENTOR(S) : Michael Alan Ford & Bernard Brian Leather

It is certified that error appears in the above-identified patent and that said Letters Patent are hereby corrected as shown below:

Column 7, line 39, change "countered" to -- counted --.

Column 7, line 41, change " stoped" to --stopped --.

Column 7, line 48, before "II)." insert -- ( --.

Column 8, line 18, change "referenced" to -- reference --.

Column 8, line 19, before "a)" insert --( --.

Signed and Sealed this

Nineteenth Day of December 1978

[SEAL]

Attest:

RUTH C. MASON
Attesting Officer

DONALD W. BANNER
Commissioner of Patents and Trademarks